US012679691B2

(12) United States Patent
Williams et al.

(10) Patent No.: US 12,679,691 B2
(45) Date of Patent: Jul. 14, 2026

(54) CAM CLEAT ASSEMBLY FOR PLUMBING FIXTURES EMPLOYING FLEXIBLE HOSES

(71) Applicant: Waterstone, LLC, Murietta, CA (US)

(72) Inventors: Alston Edward Williams, Lake Forest, CA (US); Mark Anthony Abdon Fontecha, Covina, CA (US)

(73) Assignee: WATERSTONE, LLC, Murietta, CA (US)

( * ) Notice: Subject to any disclaimer, the term of this patent is extended or adjusted under 35 U.S.C. 154(b) by 372 days.

(21) Appl. No.: 18/234,031

(22) Filed: Aug. 15, 2023

(65) Prior Publication Data

US 2025/0059735 A1     Feb. 20, 2025

(51) Int. Cl.
E03C 1/02          (2006.01)
A62C 33/04        (2006.01)
(Continued)

(52) U.S. Cl.
CPC ........... B65H 75/4423 (2013.01); B05B 1/18 (2013.01); B05B 13/0228 (2013.01); B05B 13/0278 (2013.01); B05B 15/60 (2018.02); B05B 15/62 (2018.02); B05B 15/628 (2018.02); B05B 15/65 (2018.02); B05B 15/656 (2018.02); B05B 15/68 (2018.02); B65H 75/4434 (2013.01); B65H 75/4439 (2013.01); B65H 75/4471 (2013.01); B65H 75/4478 (2013.01); E03C 1/021 (2013.01); E03C 1/025 (2013.01); E03C 1/04 (2013.01); E03C 1/0403 (2013.01); E03C 1/0404 (2013.01); E03C 1/06 (2013.01); E03C 1/063

(2013.01); E03C 1/066 (2013.01); F16L 3/012 (2013.01); A62C 33/04 (2013.01); B08B 2203/0276 (2013.01); B64D 39/02 (2013.01);
(Continued)

(58) Field of Classification Search
None
See application file for complete search history.

(56)          References Cited

U.S. PATENT DOCUMENTS 5,093,942 A * 3/1992 Lang .................. A61H 33/6036
                                                             239/197
5,381,820 A * 1/1995 Chandler ............. B65H 75/441
                                                             137/355.16
(Continued)

FOREIGN PATENT DOCUMENTS

GB             1212244 A * 11/1970 ............... A47L 9/26

*Primary Examiner* — Atif H Chaudry
(74) *Attorney, Agent, or Firm* — Myers Andras Ashman Bisol LLP; Joseph C. Andras

(57)          ABSTRACT
An apparatus for securing a flexible plumbing hose, and then conveniently releasing the hose so that it may be retracted, as well as related plumbing fixtures is disclosed. The apparatus comprises a two-piece cleat assembly which easily engages and disengages the hose. The cleat assembly comprises two spring-loaded cam cleats that can partially rotate to pinch and grip the flexible hose in place but can quickly released by physically lifting the hose away from the cleat assembly. The two-piece cleat assembly may be employed as a component in a plumbing fixture such as a shower system having a hose attached to a hand-held shower head, or in a kitchen faucet having a hose attached to a hand-held sprayer. The cleat assembly is configured as a replaceable cartridge which can easily be disassembled from the plumbing fixture for replacement or repair.

13 Claims, 7 Drawing Sheets

(51) Int. Cl.

| | |
|---|---|
| *B05B 1/18* | (2006.01) |
| *B05B 13/02* | (2006.01) |
| *B05B 15/60* | (2018.01) |
| *B05B 15/62* | (2018.01) |
| *B05B 15/628* | (2018.01) |
| *B05B 15/65* | (2018.01) |
| *B05B 15/656* | (2018.01) |
| *B05B 15/68* | (2018.01) |
| *B64D 39/02* | (2006.01) |
| *B64D 39/04* | (2006.01) |
| *B65H 75/44* | (2006.01) |
| *B67D 7/40* | (2010.01) |
| *E03C 1/04* | (2006.01) |
| *E03C 1/06* | (2006.01) |
| *F16L 3/01* | (2006.01) |

(52) U.S. Cl.

CPC .......... *B64D 39/04* (2013.01); *B65H 2701/33* (2013.01); *B65H 2701/333* (2013.01); *B67D 7/40* (2013.01); *B67D 7/406* (2013.01); *E03C 1/0408* (2013.01); *E03C 2001/0415* (2013.01)

(56) References Cited

U.S. PATENT DOCUMENTS

| | | | | |
|---|---|---|---|---|
| 2004/0177880 | A1* | 9/2004 | Nelson | E03C 1/04 |
| | | | | 137/355.23 |
| 2004/0238675 | A1* | 12/2004 | Banaszkiewicz | B65H 75/4434 |
| | | | | 242/377 |
| 2019/0368175 | A1* | 12/2019 | Abood | B65H 75/486 |
| 2023/0151596 | A1* | 5/2023 | Johnston | E03C 1/06 |
| | | | | 4/678 |

* cited by examiner

CAM CLEAT ASSEMBLY FOR PLUMBING FIXTURES EMPLOYING FLEXIBLE HOSES

BACKGROUND OF THE INVENTION

1. Field of the Invention

The present invention relates in general to plumbing fixtures employing a flexible plumbing hose. More particularly, the invention is directed to plumbing fixtures employing a cam cleat mechanism to releasably secure an extended flexible plumbing hose.

2. Description of the Related Art

Many plumbing fixtures employ a flexible plumbing hose to connect to and direct water from a stationary, mounted fixture to a hand-held water dispenser. Examples of these types of plumbing fixtures include a kitchen faucet having a flexible plumbing hose connected to a hand-held sprayer for washing dishes, or a shower system having a plumbing hose connected to a hand-held shower head. These plumbing fixtures often have a retracting mechanism which automatically retracts an extended hose back into a storage area. For example, a kitchen faucet system may have a hose that is connected to the water supply in a lower base cabinet, where the hose is then routed upward and through a hole formed in the countertop. When a user extends and then releases the hand-held sprayer, the hose will automatically retract back into the lower base cabinet as a result of the weight of the hose.

However, there may be occasions when the user does not wish for the hose to be automatically retracted when the hose is manually released. Unfortunately, conventional solutions for preventing the automatic retraction of plumbing hoses are often cumbersome and difficult to use.

Accordingly, a need exists to provide an apparatus and system to facilitate the engaging and releasing of extended flexible plumbing hoses.

SUMMARY OF THE INVENTION

In the first aspect, a plumbing fixture system is disclosed. The plumbing fixture system comprises a flexible plumbing hose for transmitting water under pressure to a hand-held nozzle or sprayer, a retracting mechanism for allowing extension and automatically retrieving of the flexible plumbing hose from a storage area, and a dynamic two-piece cleat assembly for retaining the hose at a desired position when extended.

In a first preferred embodiment, the dynamic two-piece cleat assembly comprising two spring-loaded cam members rotatable about parallel axes in a first direction, each cam member having opposed non-symmetrical convex surfaces shaped to retain the hose.

The dynamic two-piece cleat assembly is preferably configured to be readily disassembled and removed from the plumbing fixture system. The plumbing fixture system preferably comprises a shower system having a hand-held shower head. The plumbing fixture system preferably comprises a kitchen faucet having a hand-held sprayer. The storage area preferably comprises a hose reel for storing the hose, the hose reel having a spring-loaded mechanism configured to allow extension and automatically retrieving of the hose. The retracting mechanism preferably comprises the hose positioned below the hand-held nozzle or sprayer such that the weight of the hose urges the hose to retract to the storage area.

In a second aspect, a plumbing fixture system is disclosed. The plumbing fixture system comprises a flexible plumbing hose for transmitting water under pressure to a hand-held nozzle or sprayer, a retracting mechanism for allowing extension and automatically retrieving of the flexible plumbing hose from a storage area, and a plumbing fixture apparatus. The plumbing fixture apparatus comprises a spring-loaded two-piece cleat assembly for retaining the hose at a desired position when extended, the two-piece cleat assembly comprising two cam members rotatable about parallel axes in a first direction, each cam member having opposed non-symmetrical convex surfaces shaped to retain the hose, and a roller assembly including a roller rotatable about a second axis in a second direction perpendicular to the first direction of the parallel axes of the two cam members, the roller positioned above the hose to guide the hose adjacent to the two cam members when the hose is being extending or retrieving from a storage area.

In a second preferred embodiment, the spring-loaded two-piece cleat assembly and the roller assembly form an aperture through which the flexible plumbing hose is laterally confined. The dynamic two-piece cleat assembly and the roller assembly are preferably configured to be readily removed from the plumbing fixture system. The plumbing fixture apparatus further preferably comprises a roller tube placed below the flexible plumbing hose, the roller tube configured to provide support to the hose as the hose traverses the plumbing fixture apparatus. The plumbing fixture system preferably comprises a shower system having a hand-held shower head. The plumbing fixture system preferably comprises a kitchen faucet having a hand-held sprayer. The storage area preferably comprises a hose reel for storing the hose, the hose reel having a spring-loaded mechanism configured to allow extension and automatically retrieving of the hose.

In a third aspect, a plumbing fixture apparatus is disclosed. The plumbing fixture apparatus comprises a spring-loaded two-piece cleat assembly for retaining a hose at a desired position when extended, the two-piece cleat assembly comprising two cam members rotatable about parallel axes in a first direction, each cam member having opposed non-symmetrical convex surfaces shaped to retain the hose, and a roller assembly including a roller rotatable about a second axis in a second direction perpendicular to the first direction of the parallel axes of the two cam members, the roller positioned above the hose to guide the hose adjacent to the two cam members when the hose is being extending or retrieving from a storage area.

In a third preferred embodiment, the spring-loaded two-piece cleat assembly and the roller assembly form an aperture through which the flexible plumbing hose is laterally confined. The plumbing fixture apparatus is preferably configured to be readily removed from a plumbing fixture system. The plumbing fixture apparatus preferably further comprises a generally U-shaped bracket having a generally rectangular base portion having a width and a length, and first and second arms extending away from the base portion in a first direction near the edges of the length of the base portion, the base portion shaped to provide a first and second recess. The spring-loaded two-piece cleat assembly preferably comprises a first shaft and a second shaft emerging away from the first and second recess respectively fully in the first direction, and a first torsion spring and a second torsion spring mounted around the first and second shafts.

The two cam members preferably comprise a first cam member and a second cam member rotatably mounted on the first shaft and the second shaft respectively, the first and second cam members engaged with the first and second torsion springs respectively. The roller assembly preferably comprises a first and a second guide brackets each mounted to the first and second shafts respectively, the first and second guide brackets each having a hole bored in a second direction perpendicular to the first direction, and a roller shaft positioned in the bores of the first and second guide brackets. The roller having a central hole rotatably mounted on the roller shaft, the roller positioned on a side above a hose to guide the hose adjacent to the first and second cam members when the hose is being extended or retrieving from a storage area.

The plumbing fixture apparatus preferably further comprises a roller tube placed on the base portion of the generally U-shaped bracket, the roller tube rotatable about the second direction, the roller tube configured to provide support to the hose as the hose traverses the plumbing fixture apparatus. The base portion of the generally U-shaped bracket preferably includes a bottom insert that provides the first and second recesses.

These and other features and advantages of the invention will become more apparent with a description of preferred embodiments in reference to the associated drawings.

DETAILED DESCRIPTION OF THE PREFERRED EMBODIMENTS

Figure 1:
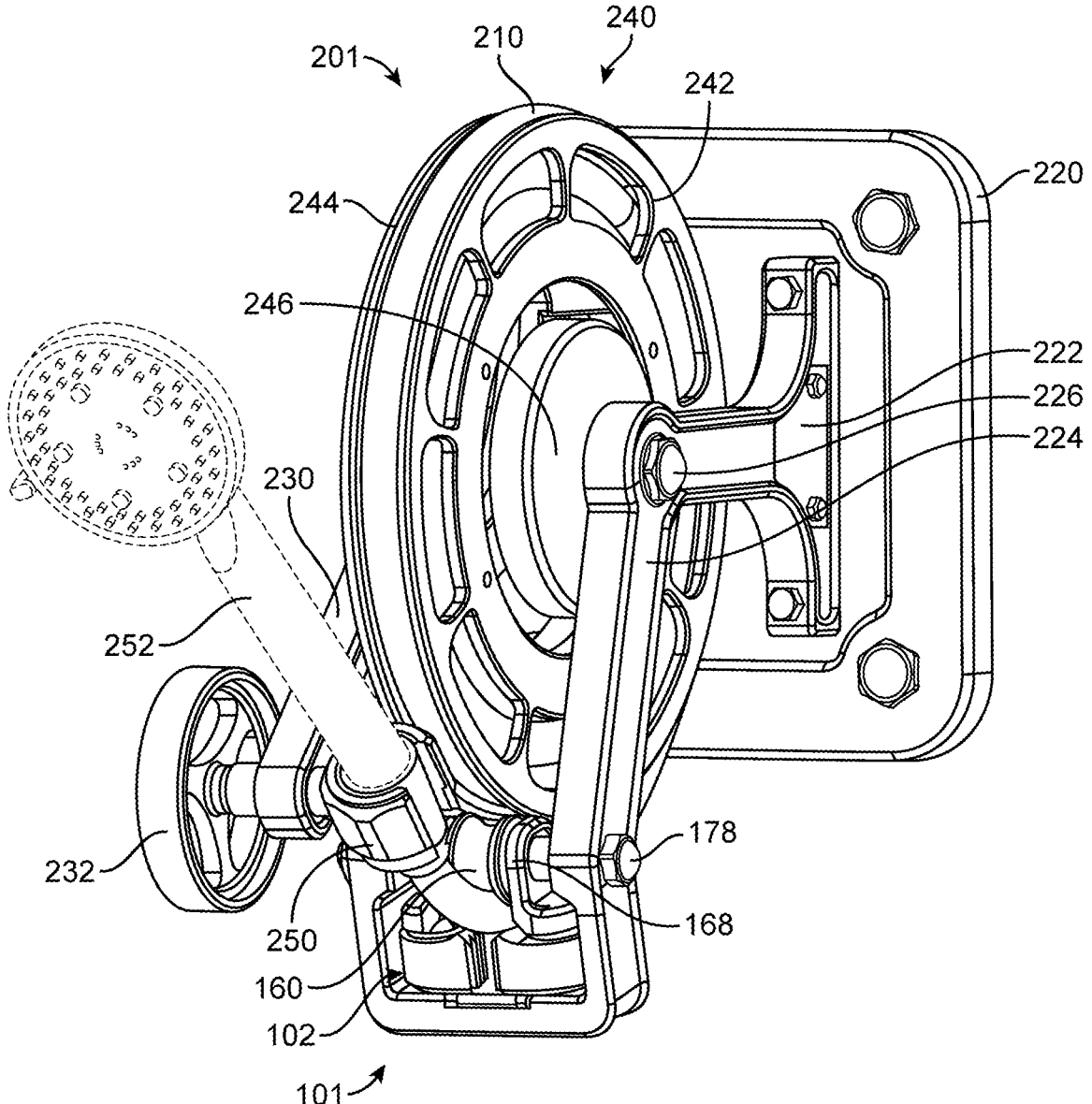
FIG. 1 is a front, perspective view of a plumbing system employing a plumbing fixture apparatus in an embodiment.

Many common household and commercial plumbing fixtures employ a flexible plumbing hose which is used to connect to and direct water from a stationary plumbing fixture to a hand-held water dispenser. Examples of these types of plumbing fixtures include a kitchen faucet having a flexible plumbing hose connected to a hand-held sprayer, or a shower system having a plumbing hose connected to a hand-held shower head. Conventional plumbing fixtures often rely on a retraction mechanism whereby the hose is automatically retracted into a storage area when the user manually releases the hand-held water dispenser.

Occasionally, the user may desire the flexible plumbing hose not to automatically retract when the hand-held water dispenser is manually released. For example, a user may want the plumbing hose from a kitchen faucet to remain extended while cleaning and rinsing dishes. Unfortunately, solutions for preventing the automatic retract of plumbing hoses are often cumbersome and difficult to use.

For example, one modern style of plumbing fixtures relies on an exposed, decorative wheel assembly which is used to store a flexible plumbing hose. The wheel assembly may be spring loaded which provides a retraction mechanism for retracting the hose back onto the wheel assembly. The wheel assembly may provide an integrated ratchet ring with a pawl having a "pull and release" feature such that an extended hose may be held at a desired length. However, some users may have difficulty using this feature as the operation may not be intuitive, or the user is unable to hear the sounds associated with the pawl engaging with the teeth of the ratchet wheel over the background noise of a shower.

In one or more embodiments, a plumbing fixture apparatus for releasably retaining a flexible plumbing hose at a desired position is contemplated. The plumbing fixture apparatus comprises a two-piece cleat assembly having two spring-loaded cam cleats. The two cam cleats are separated and designed such that, when a user slips a flexible plumbing hose between the cam cleats and gently pulls the hose outward from the fixture, the cam cleats engage with the plumbing hose to prevent the hose from being retracted.

To release the hose from the cam cleats, the user simply lifts the hose up and away from the cam cleats, which disengages the hose from the cam cleats and allows the hose to freely retract back to the stationary plumbing fixture.

In one or more embodiments, the plumbing fixture apparatus may be employed as a subcomponent in a plumbing fixture such as a shower system having a hose attached to a hand-held shower head, or in a kitchen faucet having a hose attached to a hand-held sprayer. While embodiments described herein primarily discuss the use of the plumbing fixture apparatus in terms of use as part of a shower system, it shall be understood that the plumbing fixture apparatus may be employed in other plumbing systems and fixtures.

In a preferred embodiment, the plumbing fixture apparatus is configured as a "replaceable cartridge" which can easily be disassembled from the plumbing fixture system. Unlike conventional plumbing components which may require surgical disassembly for replacement, embodiments of the plumbing fixture apparatus may be removed from the plumbing fixture by simply disassembling common mechanical fasteners such as nuts or bolts for example. This feature allows users to replace a worn or damaged plumbing fixture apparatus quickly and economically.

As used herein, the term plumbing "system" refers to systems and fixtures that employ a flexible plumbing hose to be extracted from the plumbing system so that a user can direct the spray of water. Examples of plumbing systems having a flexible plumbing hose may include a kitchen faucet having a hand-held sprayer or a shower system having a hand-held shower head. These types of plumbing systems may have a storage area for the hose when not in use, as well as a retracting mechanism for automatically recalling the hose to the storage area. Likewise, the term "apparatus" refers to a portion or component of an overall plumbing "system" which has a means for holding the hose at a fixed, desired position when in use that prevents the plumbing system from retracting the hose back to a storage area.

FIG. 1 is a front, perspective view of a shower system 201 (i.e., also referred to as "plumbing fixture system 201") employing a plumbing fixture apparatus 101 for engaging and releasing a flexible plumbing hose 210. In an embodiment, the shower system 201 comprises an escutcheon plate 220 for mounting to a shower wall. A left arm bracket 230 emerges from the escutcheon plate 220. The left arm bracket 230 is coupled to a hand shower cradle 250 for holding a hand-held shower head 252. A tilt handle 232 is coupled to the hand shower cradle 250 to adjust the angle of the hand-held shower head 252 with respect to the shower wall when the shower head 252 is mounted in the cradle 250. A right arm bracket 222 also emerges from the escutcheon plate 220 and is coupled to the right arm extension 224 at the wheel central axis 226. The right arm extension 224 is connected to the plumbing fixture apparatus 101 and is secured in place by decorative nut 178.

Both the left arm bracket 230 and the right arm bracket 222 are coupled to a central axis 226 of the wheel assembly 240. The wheel assembly 240 comprises a left wheel rim 244 and a right wheel rim 242 which are configured to receive and store a flexible plumbing hose 210. The wheel assembly 240 also comprises a spring-loaded, wheel spring hub 246 configured to apply a retracting force to the hose 210 (i.e., a retracting force which causes the wheel assembly 240 to automatically rotate to the retract and store the hose 210 about the wheel assembly 240).

The plumbing fixture apparatus 101 comprises a two-piece cleat assembly 102 and a roller assembly 168. In an embodiment, the plumbing fixture apparatus 101 has a two-piece cleat assembly 102 having two spring-loaded cam members 150*l* and 150*r* (i.e., "cam cleats," illustrated in FIGS. 2, 5, and 6 and discussed below). The two cam members 150*l* and 150*r* are separated and designed such that, when a user slips the flexible plumbing hose 210 between the cam members 150*l* and 150*r* and gently pulls the hose 210 outward from the mounted part 220 of the fixture 201, the plumbing hose 210 is held in place or prevented from being retracted. The user may release the hose 210 by lifting the hose 210 up and away from the two cam members 150*l* and 150*r*. In an embodiment, roller 160 is positioned above hose 210 as discussed below.

In a preferred embodiment, the plumbing fixture apparatus 101 is readily removable from the stationary, fixed position 222 of the fixture 201 such that replacement of a worn or defective plumbing fixture apparatus 101 is performed quickly and economically. For example, the plumbing fixture apparatus 101 may be detached from the shower system 201 simply by removing nut 178 so that the plumbing fixture apparatus 101 is separated as shown in FIG. 2.

During operation, shower water is provided to the flexible plumbing hose 210 which is wrapped around the spring-loaded wheel assembly 240. The hose 210 then passes through the plumbing fixture apparatus 101 and is connected to the hand-held shower head 252.

Hence, in an embodiment, the plumbing fixture system 201 (i.e., shower system 201) comprises a flexible plumbing hose 210 for transmitting water under pressure to a hand-held nozzle or sprayer 252 (i.e., hand-held shower head 252). The system 201 further comprises a retracting mechanism 246 (i.e., the spring-loaded, wheel spring hub 246) for allowing extension and automatically retrieving of the flexible plumbing hose 210 from a storage area (i.e., the wheel assembly 240). The system 201 further comprises a dynamic two-piece cleat assembly 102 for retaining the hose 210 at a desired position when extended. In an embodiment, the dynamic two-piece cleat assembly 102 may comprise two spring-loaded cam members (e.g., 150*l* and 150*r*; see FIG. 5).

Figure 2:
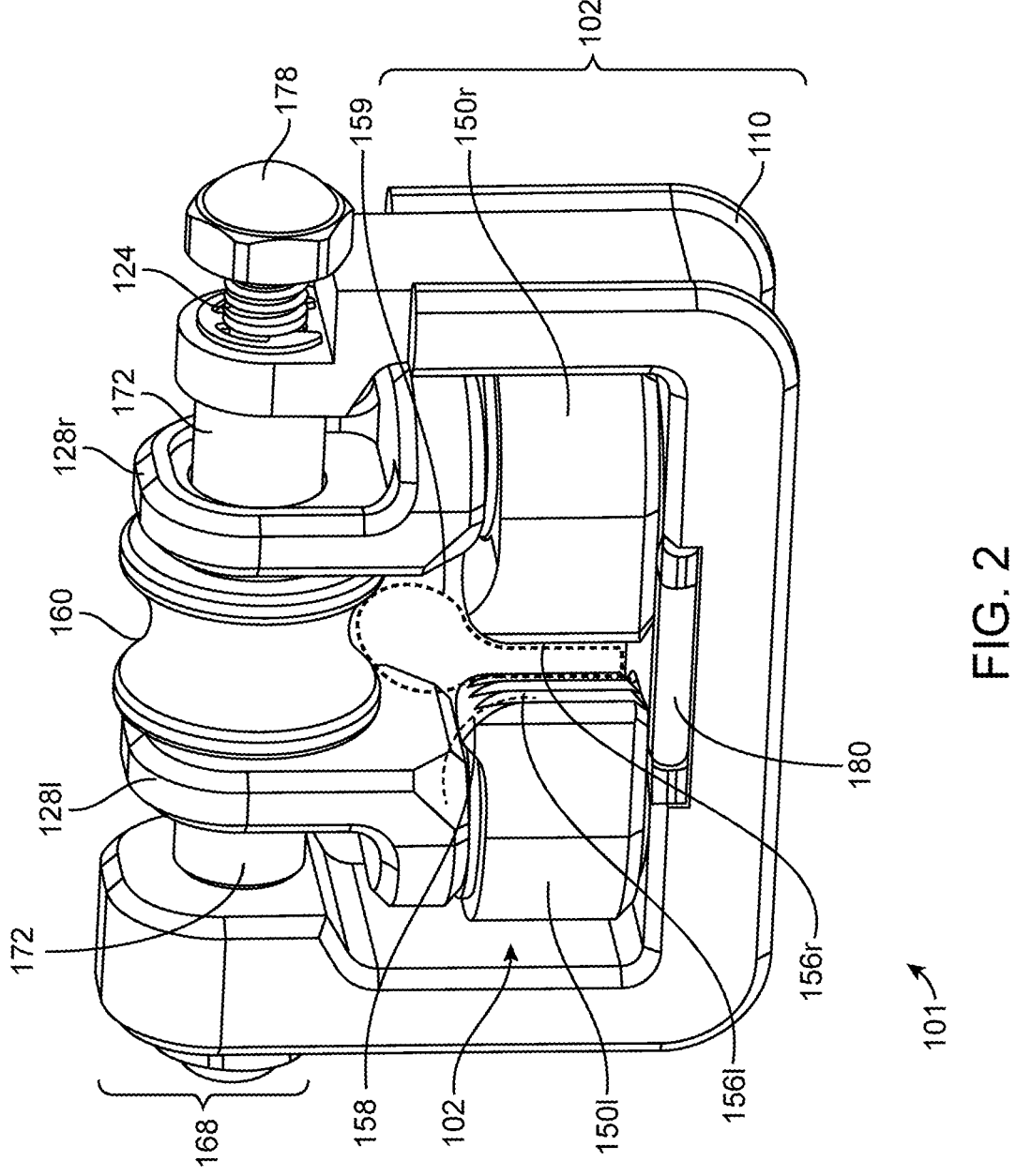
FIG. 2 is front, perspective view of the plumbing fixture apparatus.

FIG. 2 is front, perspective view of a plumbing fixture apparatus 101 configured for engaging and releasing the flexible plumbing hose 210. The plumbing fixture apparatus 101 comprises a two-piece cleat assembly 102 and a roller assembly 168. The two-piece cleat assembly 102 comprises a left cam member 150*l* (i.e., a first cam member 150*l*) and a right cam member 150*r* (i.e., a second cam member 150*r*). The left and right cam members 150*l* and 150*r* are rotatably mounted to a cleat holder arm bracket 110 (i.e., a generally U-shaped bracket 110). As the left and right cam members 150*l* and 150*r* each have an opposed, non-symmetrical surfaces 154*l* and 154*r* (shown more clearly in FIG. 6), the left and right cam members 154*l* and 154*r* are configured to releasably pinch and retain the hose 210 upon rotation of the cam members 154*l* and 154*r*. Cleats 156*l* and 156*r* are formed on the inner surfaces of the cam members 156*l* and 156*r*. Chamfers 158 are formed on the cam members 150*l* and 150*r* to facilitate the hose 210 being placed between the cam members 150*l* and 150*r*.

Roller assembly 168 comprises left and right guide brackets 128*l* and 128*r* (i.e., first guide bracket 128*l* and second guide bracket 128*r*), spacers 172, and a central roller shaft 124 about which roller 160 is rotatably mounted. The roller assembly 168 is formed by a roller 160 positioned above the left and right cam members 154*l* and 154*r*, which forms an aperture 159 through which the flexible plumbing hose 210 is laterally confined. Roller 160 is rotatably mounted about an axis perpendicular to an axis of rotation of the two-piece cleat assembly 102 (discussed below and illustrated in FIG. 6). The roller assembly 168 further comprises left and right guide brackets 128*l* and 128*r* (i.e., first and second guide brackets 128*l* and 128*r*) which are coupled to the left and right cam members 154*l* and 154*r* and provide support for shaft 124 about which the roller 160 rotates.

Aperture 159 represents the boundaries of the lateral position of hose 210 passing through the plumbing fixture apparatus 101. Aperture 159 is generally defined by the horizontal space between the cam members 150*l* and 150*r* and the vertical space from the bottom of the cam members 150*l* and 150*r* to the roller 160 in an embodiment.

Positioning roller 160 near the cam members 150*l* and 150*r* limits the horizontal and vertical distances that the hose 210 is free to traverse.

In a preferred embodiment, aperture 159 should be sized to just accommodate the hose 210, keeping the hose 210 laterally confined, while providing adequate lateral clearance in order for the hose 210 to be freely extracted or retracted. This ensures that the hose 210 is automatically aligned with the cam members 150*l* and 150*r*. Hence, a user may simply engage or disengage the hose 210 from cam members 150*l* and 150*r* easily without having to locate and visually align the position of the hose 210 with respect to cam members 150*l* and 150*r*.

Roller tube 180 is rotatably mounted on the generally U-shaped bracket 110. Roller tube 180 is rotatable such that the roller tube 180 is configured to provide support to the hose 210 as the hose 210 traverses the plumbing fixture apparatus 101.

Figure 3:
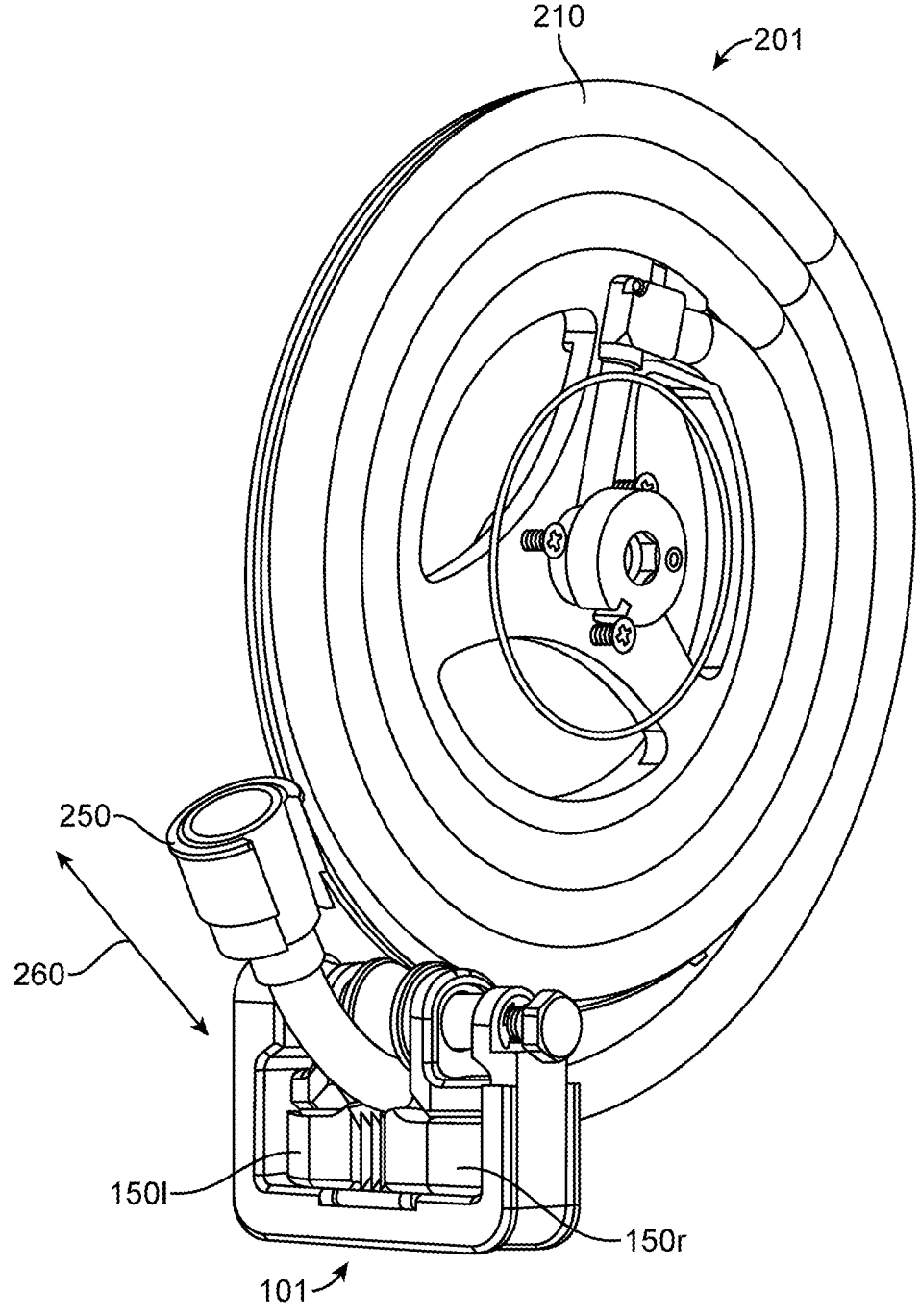
FIG. 3 is a front, perspective view of a partially disassembled shower system illustrating the plumbing hose freely extending and retracting when the plumbing hose is positioned above the cam members.
Figure 4:
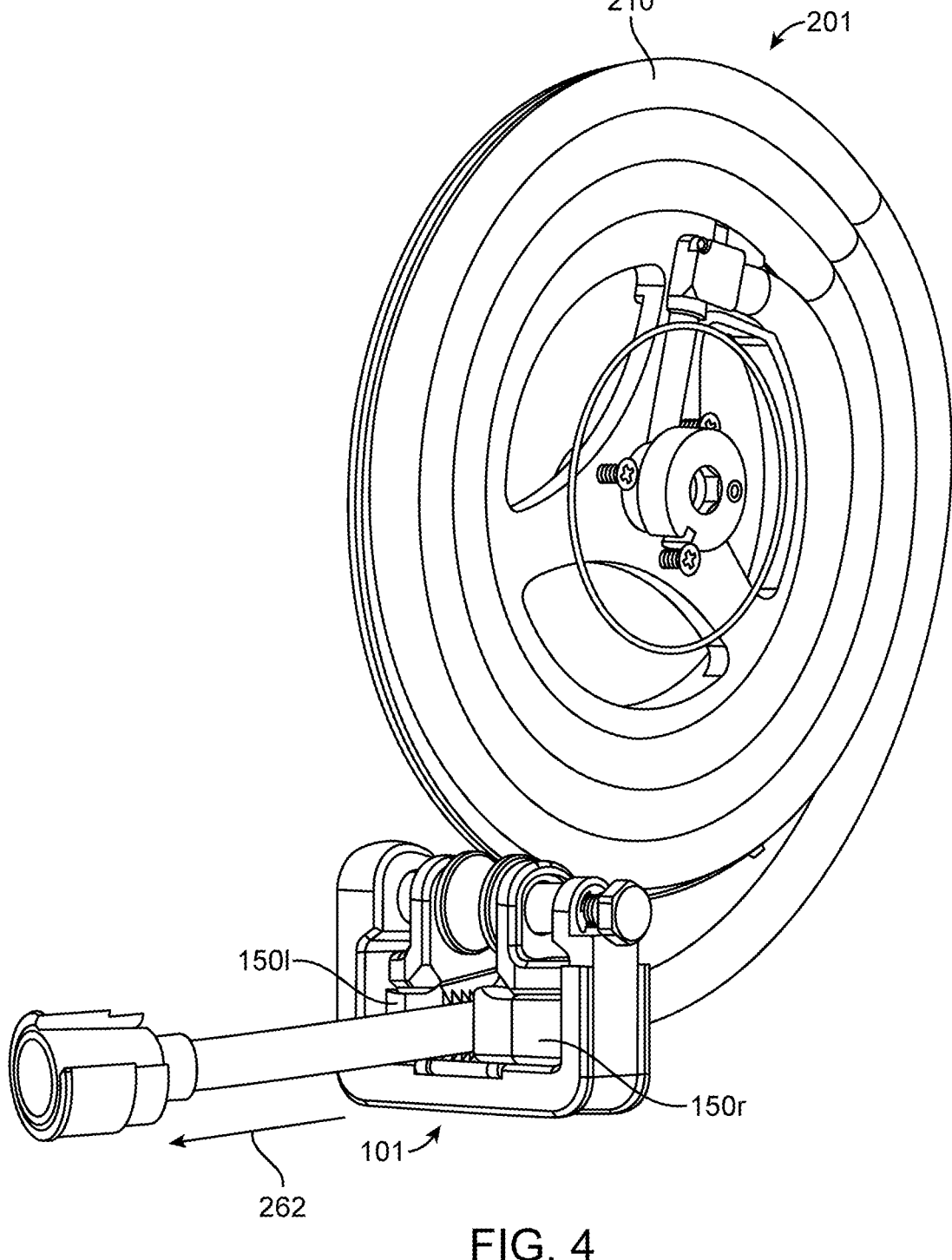
FIG. 4 is a front, perspective view of a partially disassembled shower system illustrating the plumbing hose secured in place when the plumbing hose is positioned between the cam members.

FIGS. 3-4 illustrate the operation of the plumbing fixture apparatus 101 for disengaging and engaging with the hose 210. FIG. 3 is a front, perspective view of a partially disassembled shower system 201 illustrating that the plumbing hose 210 positioned above the cam members 150*l* and 150*r*. Since the hose 210 is not secured by the cam members 150*l* and 150*r*, the hose 210 freely extends and retracts as indicated by bi-directional arrow 260.

FIG. 4 is a front, perspective view of a partially disassembled shower system 201 illustrating that the plumbing hose 210 is placed between cam members 150*l* and 150*r*. As the hose 210 is engaged by the cam members 150*l* and 150*r*, the hose 210 is either secured in place, or alternatively, the hose 210 able only to be extracted as indicated by the one-directional arrow 262.

Figure 5:
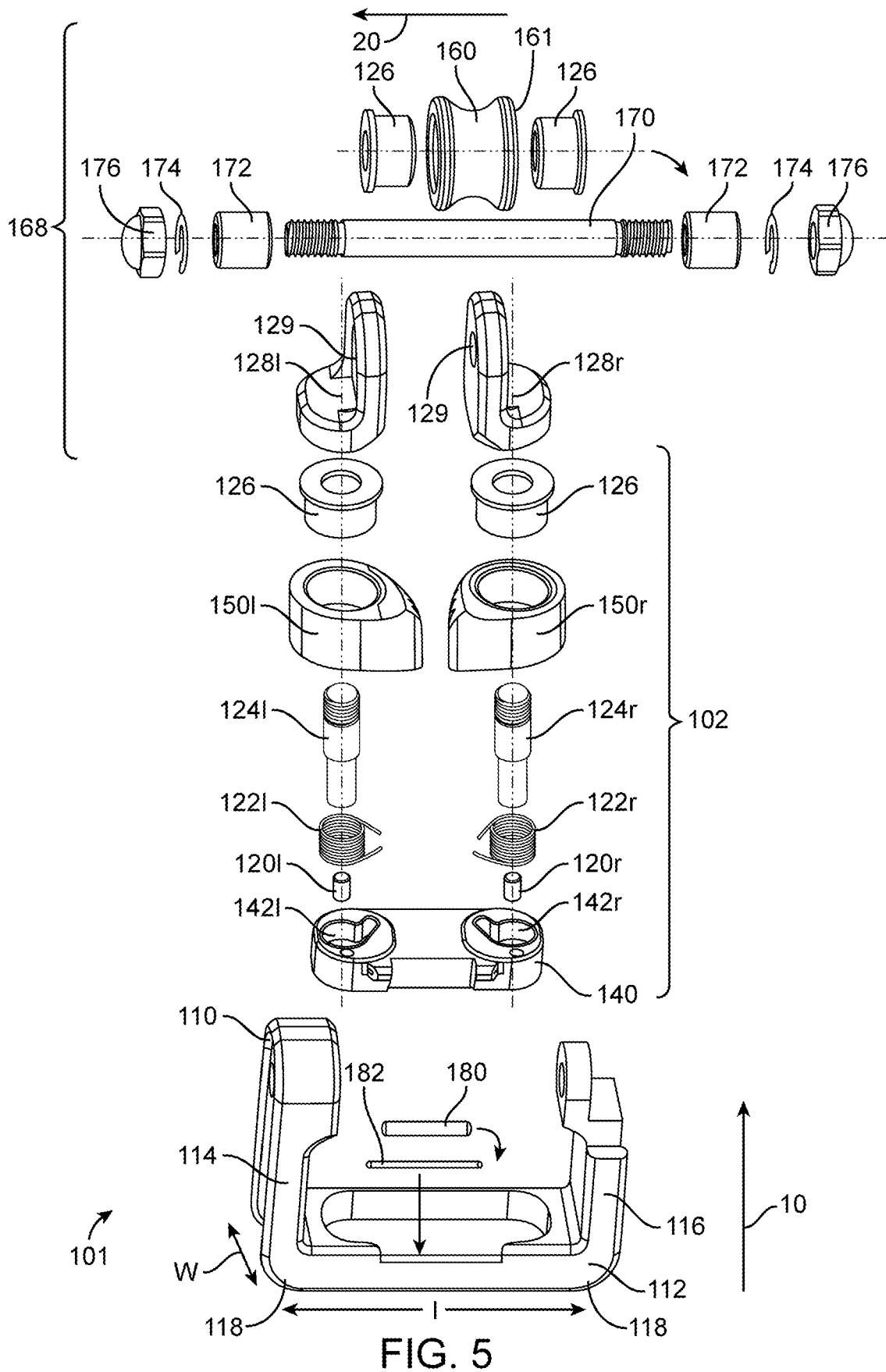
FIG. 5 is an exploded view of the plumbing fixture apparatus.

FIG. 5 is an exploded view of the plumbing fixture apparatus 101. The plumbing fixture apparatus 101 comprises a generally U-shaped bracket 110 (i.e., cleat holder arm bracket 110) having a generally rectangular base portion 112 having a width "w" and a length "l." First arm 114 and second arm 116 extend away from the base portion 112 in a first direction 10 near the edges 118 of the length of the base portion 112.

The base portion 112 is shaped to provide a first recess 142l and a second recess 142r. In an embodiment, the plumbing fixture apparatus 101 comprises a bottom insert 140 in which the first recess 142l and a second recess 142r are formed. In an embodiment, the first recess 142l and the second recess 142r are formed into the base portion 112 of the generally U-shaped bracket 110.

The two-piece cleat assembly 102 comprises a first shaft 124l and a second shaft 124r emerging away from the first recess 142l and the second recess 142r, respectively, in the first direction 10. The two-piece cleat assembly 102 further comprises a first torsion spring 122l and a second torsion spring 122r mounted around the first shaft 124l and second shaft 124r respectively. A first dowel pin 120l and a second dowel pin 120r are placed in the first and second recess 142l and 142r respectively to engage the first and second torsion springs 122l and 122r.

Figure 6:
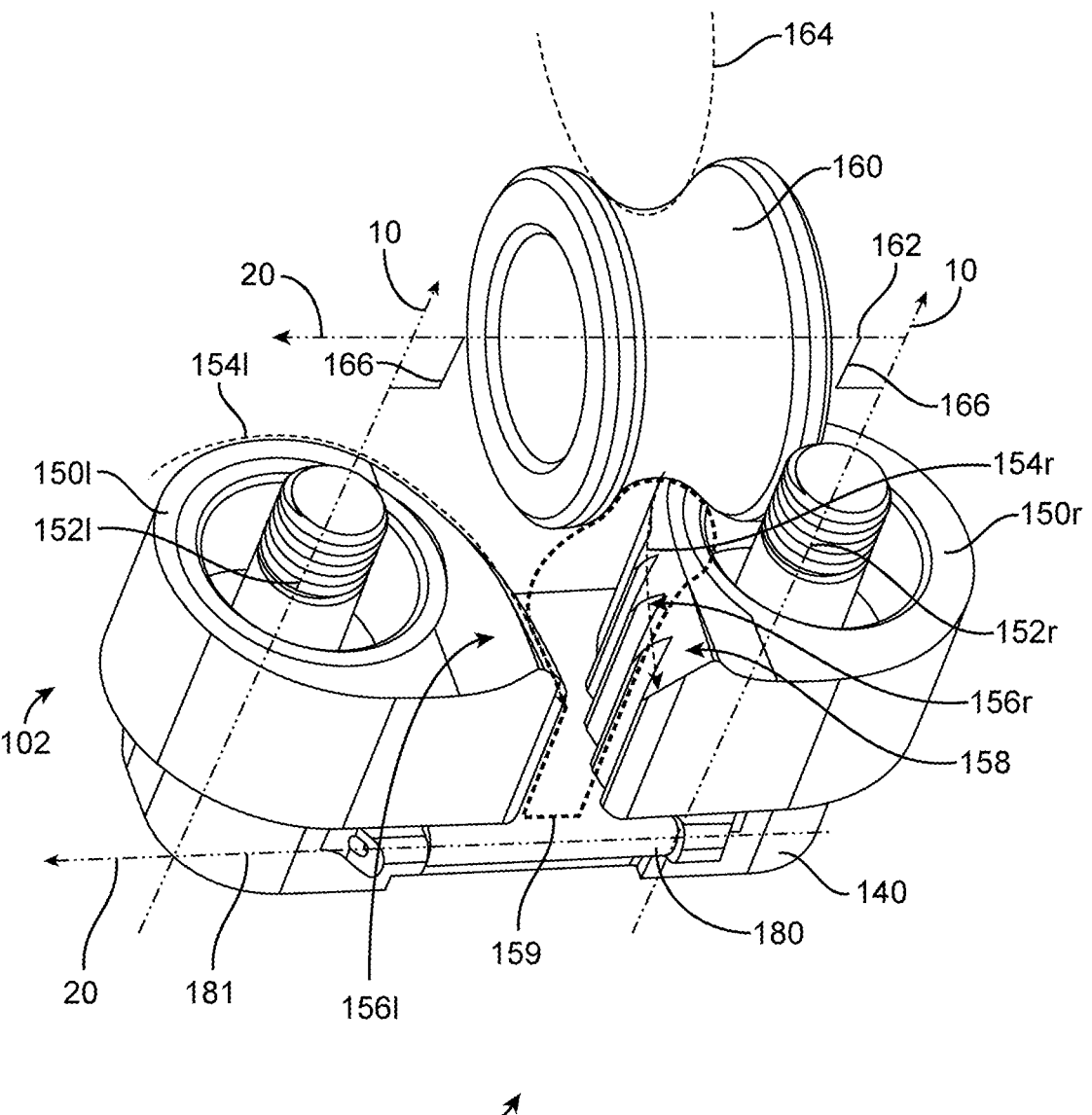
FIG. 6 is a schematic view of the relative positions and orientations of the cam members and the roller.

The two-piece cleat assembly 102 further comprises a first cam member 150l and a second cam member 150r rotatably mounted on the first shaft 124l and the second shaft 124r respectively. The first and second cam members 150l and 150r are engaged with the first and second torsion springs 122l and 122r respectively. The first 150l and second cam member 150r have opposed non-symmetrical convex surfaces 154l and 154r (FIG. 6) shaped to retain a flexible plumbing hose 210. The outer surfaces 154l and 154r of the first and second cam members 150l and 150r have a series of teeth 156l and 156r formed thereon to engage with the hose 210 (FIG. 6). Guide thrusts washers 126 are placed within the cam members 150l and 150r.

Roller assembly 168 has a first and a second guide brackets 128l and 128r each mounted to the first and second shafts 124l and 124r respectively. The first and second guide brackets 128l and 128r each has a hole 129 bored in a second direction 20 perpendicular to the first direction 10. Roller shaft 170 is positioned in the bores 129 of the first and second guide brackets 128l and 128r. A roller 160 having a central hole 161 is rotatably mounted on the roller shaft 170. Roller assembly 168 further comprises spacers 172, retaining ring 174, and nuts 176.

The roller 160 is positioned on a side above a hose 210 to guide the hose 210 adjacent to the first and second cam members 150l and 150r when the hose 210 is being extended or retrieving from a storage area such as the wheel assembly 240.

Roller tube 180 is rotatably mounted on roller dowl 182 and are placed on the base portion 112 of the generally U-shaped bracket 110. The roller tube 180 is rotatable about the roller dowl 182 in a second direction 20 (perpendicular to the first direction 10) such that the roller tube 180 is configured to provide support to the hose 210 as the hose 210 traverses the cleat assembly.

FIG. 6 is a schematic view of the relative positions and orientations of the cam members 150l and 150r and the roller 160. In an embodiment, a spring-loaded two-piece cleat assembly 102 for retaining the hose at a desired position when extended comprises two cam members 150l and 150r rotatable about parallel axes 152l and 152r which are pointed in direction 10. Each cam member 150l and 150r has opposed non-symmetrical convex surfaces 154l and 154r shaped to retain the hose 210. Cleats 156l and 156r are formed on a portion of the surfaces 154l and 154r. Chamfers 158 are formed on cam members 150l and 150r to facilitate the hose 210 being placed between the cam members 150l and 150r.

Roller 160 is rotatable about a roller axis 162 aligned with second direction 20 perpendicular (i.e., right angles 166) to the first set of parallel axes 10 of the two cam members 150l and 150r. Roller 160 has a curvature 164 to receive the hose 210, and is positioned above the hose 210 to guide the hose adjacent to the two cam members 150l and 150r when the hose is being extending or retrieving from a storage area.

Roller Tube 180 is positioned into the bottom insert 140 and rotates about axis 181 which is aligned with second direction 20.

Figure 7:
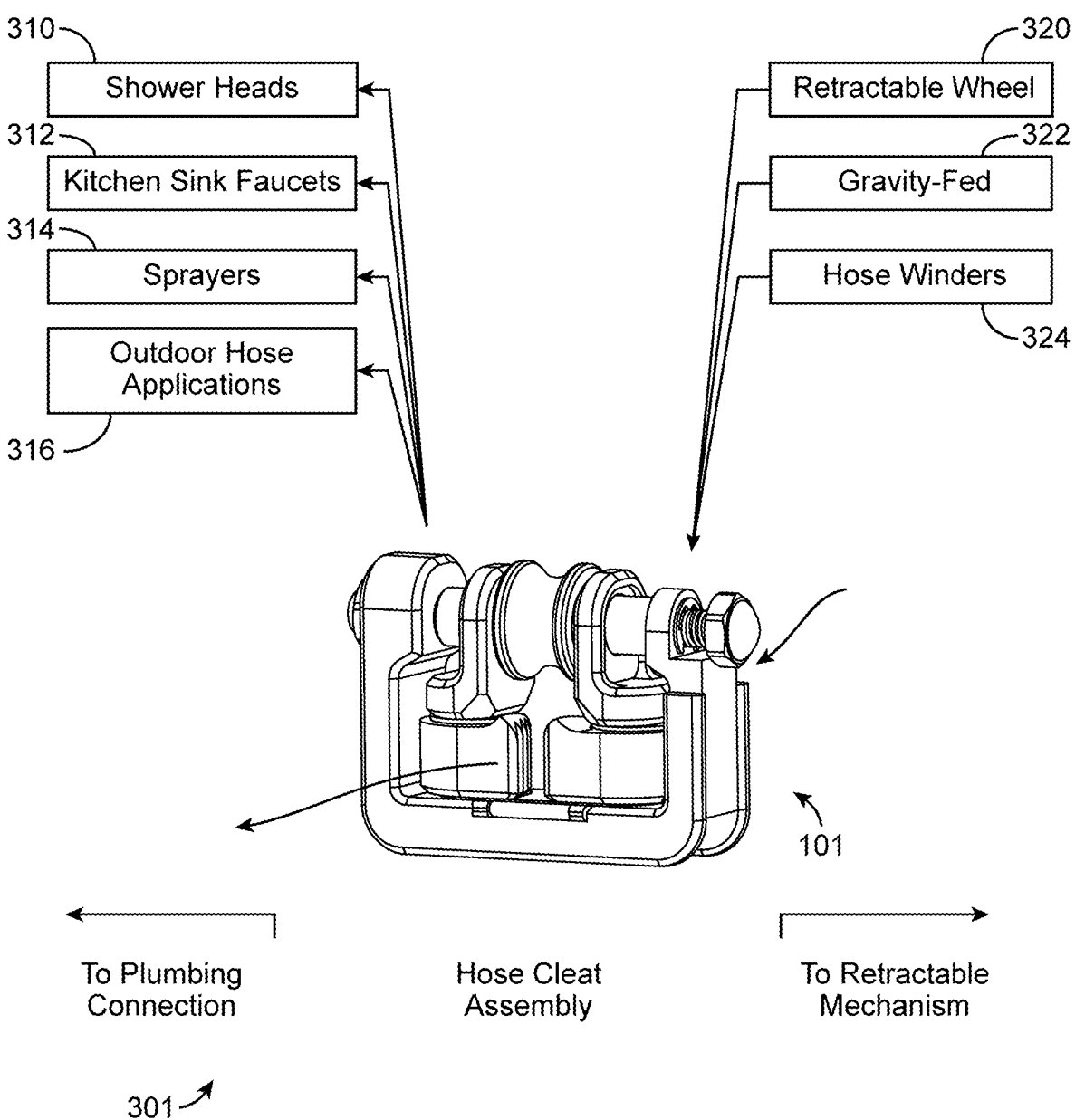
FIG. 7 is a schematic diagram showing the plumbing fixture apparatus interfacing with various sprayers and hose storage and retraction systems.

FIG. 7 is a schematic diagram showing the plumbing fixture apparatus 101 interfacing with various sprayers and hose storage/retraction systems. As discussed above, embodiments of the plumbing fixture apparatus 101 may be adapted to various plumbing fixtures and applications. Embodiments may be employed to interface with shower heads 310, kitchen sink faucets 312, sprayers 314, and outdoor hose connections 316. Exemplary types of hose storage and retraction systems include retractable wheels 320, gravity-fed 322 systems where the weight of the hose retracts the hose into storage, and hose winders 324.

In an embodiment, the plumbing fixture system 201 comprises a shower system having a hand-held shower head. In some fixtures, the storage area comprises a hose reel (e.g., wheel assembly 240) for storing the hose where the hose reel has a spring-loaded mechanism configured to allow extension and automatically retrieving of the hose 210.

In an embodiment, the plumbing fixture system 201 comprises a kitchen faucet having a hand-held sprayer. In some fixtures, the retracting mechanism comprises the hose positioned below the hand-held nozzle or sprayer such that the weight of the hose urges the hose to retract to the storage area.

Although the invention has been discussed with reference to specific embodiments, it is apparent and should be understood that the concept can be otherwise embodied to achieve the advantages discussed. The preferred embodiments above have been described primarily as a cam cleat mechanism to releasably secure a flexible plumbing hose in place. In this regard, the foregoing description of the cam cleat mechanism is presented for purposes of illustration and description. It shall be apparent that other types of equipment would benefit from the aspects of the cam cleat mechanism.

Furthermore, the description is not intended to limit the invention to the form disclosed herein. Accordingly, variants and modifications consistent with the following teachings, skill, and knowledge of the relevant art, are within the scope of the present invention. The embodiments described herein are further intended to explain modes known for practicing the invention disclosed herewith and to enable others skilled in the art to utilize the invention in equivalent, or alternative embodiments and with various modifications considered necessary by the particular application(s) or use(s) of the present invention.

What is claimed is:

1. A plumbing fixture system comprising:
   a flexible plumbing hose for transmitting water under pressure to a hand-held nozzle or sprayer;

a retracting mechanism for allowing extension and automatically retrieving of the flexible plumbing hose from a storage area;

a plumbing fixture apparatus comprising:

a spring-loaded two-piece cleat assembly for retaining the hose at a desired position when extended, the two-piece cleat assembly comprising two cam members rotatable about parallel axes in a first direction, each cam member having opposed non-symmetrical convex surfaces shaped to retain the hose; and a roller assembly including a roller rotatable about a second axis in a second direction perpendicular to the first direction of the parallel axes of the two cam members, the roller positioned above the hose to guide the hose adjacent to the two cam members when the hose is being extending or retrieving from a storage area.

2. The plumbing fixture system of claim 1, wherein the spring-loaded two-piece cleat assembly and the roller assembly form an aperture through which the flexible plumbing hose is laterally confined.

3. The plumbing fixture system of claim 1, wherein the dynamic two-piece cleat assembly and the roller assembly are configured to be readily removed from the plumbing fixture system.

4. The plumbing fixture system of claim 1, wherein the plumbing fixture apparatus further comprises a roller tube placed below the flexible plumbing hose, the roller tube configured to provide support to the hose as the hose traverses the plumbing fixture apparatus.

5. The plumbing fixture system of claim 1, wherein the plumbing fixture system comprises a shower system having a hand-held shower head.

6. The plumbing fixture system of claim 1, wherein the plumbing fixture system comprises a kitchen faucet having a hand-held sprayer.

7. The plumbing fixture system of claim 1, wherein the storage area comprises a hose reel for storing the hose, the hose reel having a spring-loaded mechanism configured to allow extension and automatically retrieving of the hose.

8. A plumbing fixture apparatus comprising:

a spring-loaded two-piece cleat assembly for retaining a hose at a desired position when extended, the two-piece cleat assembly comprising two cam members rotatable about parallel axes in a first direction, each cam member having opposed non-symmetrical convex surfaces shaped to retain the hose; and a roller assembly including a roller rotatable about a second axis in a second direction perpendicular to the first direction of the parallel axes of the two cam members, the roller positioned above the hose to guide the hose adjacent to the two cam members when the hose is being extending or retrieving from a storage area.

9. The plumbing fixture apparatus of claim 8, wherein the spring-loaded two-piece cleat assembly and the roller assembly form an aperture through which the flexible plumbing hose is laterally confined.

10. The plumbing fixture apparatus of claim 8, wherein the plumbing fixture apparatus is configured to be readily removed from a plumbing fixture system.

11. The plumbing fixture apparatus of claim 8, further comprising:

a generally U-shaped bracket having a generally rectangular base portion having a width and a length, and first and second arms extending away from the base portion in a first direction near the edges of the length of the base portion, the base portion shaped to provide a first and second recess;

wherein:

the spring-loaded two-piece cleat assembly comprises:

a first shaft and a second shaft emerging away from the first and second recess respectively fully in the first direction; and, a first torsion spring and a second torsion spring mounted around the first and second shafts;

the two cam members comprise:

a first cam member and a second cam member rotatably mounted on the first shaft and the second shaft respectively, the first and second cam members engaged with the first and second torsion springs respectively;

the roller assembly comprises:

a first and a second guide brackets each mounted to the first and second shafts respectively, the first and second guide brackets each having a hole bored in a second direction perpendicular to the first direction;

a roller shaft positioned in the bores of the first and second guide brackets; and, the roller having a central hole rotatably mounted on the roller shaft, the roller positioned on a side above a hose to guide the hose adjacent to the first and second cam members when the hose is being extended or retrieving from a storage area.

12. The plumbing fixture apparatus of claim 11, further comprising a roller tube placed on the base portion of the generally U-shaped bracket, the roller tube rotatable about the second direction, the roller tube configured to provide support to the hose as the hose traverses the plumbing fixture apparatus.

13. The plumbing fixture apparatus of claim 11, wherein the base portion of the generally U-shaped bracket includes a bottom insert that provides the first and second recesses.

\* \* \* \* \*